US012530064B2

(12) United States Patent
Boddu et al.

(10) Patent No.: US 12,530,064 B2
(45) Date of Patent: Jan. 20, 2026

(54) POWER AWARE THERMAL MITIGATION FRAMEWORK

(71) Applicant: QUALCOMM Incorporated, San Diego, CA (US)

(72) Inventors: Lakshmi Kanth Boddu, Dundigal Gandimaisamma (IN); Rohit Singh, Hyderabad (IN); Srikar Karnam Venkat Naga, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 77 days.

(21) Appl. No.: 18/428,959

(22) Filed: Jan. 31, 2024

(65) Prior Publication Data

US 2025/0244806 A1 Jul. 31, 2025

(51) Int. Cl.
*G06F 1/20* (2006.01)
*G06F 1/28* (2006.01)
*G06F 1/3234* (2019.01)
*G06F 1/324* (2019.01)

(52) U.S. Cl.
CPC ............ *G06F 1/206* (2013.01); *G06F 1/28* (2013.01); *G06F 1/324* (2013.01); *G06F 1/3243* (2013.01)

(58) Field of Classification Search
CPC ........... G06F 1/206; G06F 1/28; G06F 1/324; G06F 1/3243
See application file for complete search history.

(56) References Cited

U.S. PATENT DOCUMENTS

| | | | |
|---|---|---|---|
| 2016/0239057 A1* | 8/2016 | Kocagoez | G06F 11/3024 |
| 2017/0262030 A1* | 9/2017 | Lee | G06F 1/20 |
| 2020/0110451 A1* | 4/2020 | He | G06F 1/1684 |
| 2022/0404890 A1* | 12/2022 | Parashurama | G06F 1/3296 |
| 2025/0060809 A1* | 2/2025 | Babajani | G06F 1/325 |
| 2025/0085770 A1* | 3/2025 | Louie | G06F 1/329 |

* cited by examiner

*Primary Examiner* — Nimesh G Patel
(74) *Attorney, Agent, or Firm* — Loza & Loza, LLP

(57) ABSTRACT

Aspects relate to mechanisms for providing a power aware thermal mitigation framework for a system-on-chip (SoC) of a device (e.g., a mobile device). A thermal controller of the SoC is configured to calculate a respective power of each of a plurality of electronic control units (ECUs) on the SoC at run time. The ECUs may include, for example, central processing units (CPUs), graphic processing units (GPUs), neural signal processors (NSPs), etc. In response to a skin temperature of the device exceeding a threshold (e.g., a thermal limit of the device), the thermal controller may then be configured to apply at least one thermal mitigation action to at least one ECU of the plurality of ECUs based on the respective power of each of the ECUs.

27 Claims, 10 Drawing Sheets

SoC-A

| Tj | Power |
|---|---|
| CPU at 55C | 1.4 W |
| NSP at 60C | 0.8 W |
| GPU at 55C | 0.9 W |

SoC-B

| Tj | Power |
|---|---|
| CPU at 55C | 1.1 W |
| NSP at 60C | 0.8 W |
| GPU at 55C | 0.9 W |

SoC-C

| Tj | Power |
|---|---|
| CPU at 55C | 0.8 W |
| NSP at 60C | 1.0 W |
| GPU at 55C | 1.1 W |

FIG. 4

POWER AWARE THERMAL MITIGATION FRAMEWORK

TECHNICAL FIELD

The technology discussed below relates generally to thermal management of a system-on-chip (SoC), and more particularly, to thermal mitigation based on power consumption of an electronic control unit on an SoC.

INTRODUCTION

System-on-chip (SoC) technology has emerged as a key component in mobile devices. SoC technology integrates multiple electronic control units (ECUs) (e.g., central processing units (CPUs), graphic processing units (GPUs), neural signal processors (NSPs), digital signal processors (DSPs), Double Data Rate Synchronous Dynamic Random-Access Memory (DDR SDRAM), hardware accelerators, fixed function accelerators, etc.) onto a single chip. SoCs can reduce the overall system size and cost as all components are on the same chip and internally connected.

Mobile devices typically include a thermal framework that monitors the temperature of the mobile device and implements thermal mitigation actions when the thermal limit is exceeded to mitigate the effects of high temperatures on the mobile device. For example, high temperatures within a mobile device may affect the structural integrity or performance of components (e.g., ECUs on an SoC). Thermal mitigation actions may include, for example, clock or frequency throttling of one or more ECUs on an SoC.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, an apparatus is provided including a plurality of electronic control units (ECUs) on a system-on-chip (SoC) and a thermal controller configured to calculate a respective power of each of a plurality of electronic control units (ECUs) on the SoC at run time. The thermal controller is further configured to apply at least one thermal mitigation action to at least one ECU of the plurality of ECUs based on the respective power of each of the plurality of ECUs in response to a skin temperature of the apparatus exceeding a threshold.

Another example provides a method of thermal mitigation on a system-on-chip (SoC) of a device. The method includes calculating a respective power of each of a plurality of electronic control units (ECUs) on the SoC at run time and applying at least one thermal mitigation action to at least one ECU of the plurality of ECUs based on the respective power of each of the plurality of ECUs in response to a skin temperature of the device exceeding a threshold.

Another example provides a system-on-chip of a device including means for calculating a respective power of each of a plurality of electronic control units (ECUs) on the SoC at run time and means for applying at least one thermal mitigation action to at least one ECU of the plurality of ECUs based on the respective power of each of the plurality of ECUs in response to a skin temperature of the device exceeding a threshold.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the features discussed herein. In other words, while one or more examples may be discussed as having certain features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIG. 4 is a diagram illustrating examples of power per electronic control unit (ECU) for SoCs according to some aspects.

DETAILED DESCRIPTION

Figure 1:
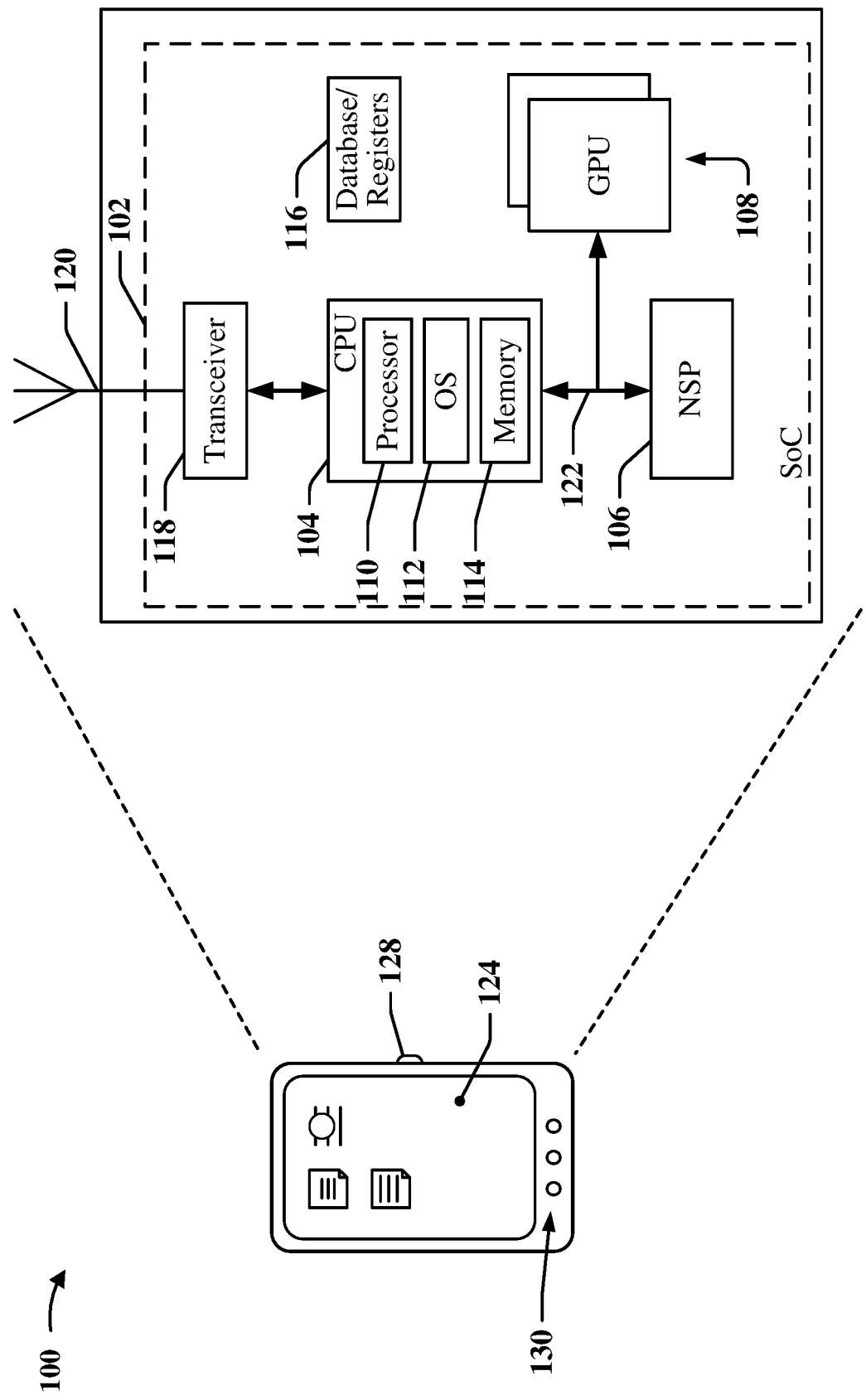
FIG. 1 is a diagram depicting an apparatus employing a system-on-chip (SoC) according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, firmware, or any combination thereof. Whether such elements are implemented as hardware or software depends upon the particular application and design constraints imposed on the overall system.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of described examples. It is intended that innovations described herein may be practiced in a wide variety of devices, chip-level components, systems, distributed arrangements, end-user devices, etc., of varying sizes, shapes, and constitution.

An apparatus, such as a mobile device (e.g., user equipment (UE), may include a system-on-chip (SoC), which may include a plurality of electronic control units (ECU) (e.g., CPU, GPU, NSP, transceiver/modem, DSP, DDR, SDRAM, etc.). To minimize the impact of the heat produced by these ECUs during operation of the apparatus, various thermal mitigation measures may be implemented. For example, a skin temperature of the apparatus may be measured (e.g., near an external surface of the apparatus) and compared to a thermal limit (e.g., a threshold). When the skin temperature exceeds the thermal limit, one or more thermal mitigation actions (e.g., frequency or clock throttling) may be applied. The thermal mitigation actions are typically preconfigured on the SoC as part of a thermal framework. For example, the thermal framework may be configured to always throttle the CPU first when the thermal limit is exceeded.

However, static selection of an ECU to throttle may not result in sufficient thermal reduction. Since the device thermals are dependent upon the power consumption by each ECU, throttling an ECU with lower power consumption may not lower the skin temperature below the thermal limit. In addition, this may result in unnecessarily throttling an ECU that is not significantly contributing to the thermals on the device, thereby negatively affecting device performance.

In various aspects of the disclosure, a thermal mitigation framework is provided that applies thermal mitigation actions to ECUs based on the respective power of each of the ECUs. For example, a thermal controller of an SoC on a device (e.g., a mobile device) may be configured to calculate a respective power of each of a plurality of ECUs on the SoC. In response to a skin temperature of the device exceeding the threshold (thermal limit), the thermal controller may then be configured to apply a first thermal mitigation action to a first ECU having a highest power among each of the plurality of ECUs on the SoC. The power consumption of each of the ECUs may then be updated, and if the skin temperature continues to exceed the thermal limit, the thermal controller may then apply a second thermal mitigation action to a second ECU having a highest power among the remaining ECUs on the SoC.

In some examples, the power of a given ECU may be calculated by combining a dynamic power and a leakage power of the given ECU. The dynamic power of the given ECU may be calculated based on a reference dynamic power associated with a reference ECU and a dynamic scaling factor for the given ECU. For example, the dynamic scaling factor may be calculated based on a device settling voltage of the given ECU and a reference settling voltage of the reference ECU in accordance with an operating frequency of the given ECU. Each of the reference dynamic power, the reference settling voltage and the device settling voltage may be stored on the given ECU.

Similarly, the leakage power of the given ECU may be calculated based on a reference leakage power of the reference ECU and a leakage scaling factor for the given ECU. For example, the leakage scaling factor may be calculated based not only on the device settling voltage and the reference settling voltage, but also a reference leakage current of the reference ECU, a device leakage current of the given ECU, and a junction temperature scaling factor. The junction temperature scaling factor is based on a measured junction temperature of the given ECU.

FIG. 1 is a diagram depicting an apparatus employing a system-on-chip (SoC) according to some aspects. In one example, the apparatus 100 may include a radio communication device that communicates through a radio frequency (RF) communications transceiver 118 with a radio access network (RAN), a core access network, the Internet and/or another network. The communications transceiver 118 may be embodied in, or operably coupled to a SoC 102 (the former being illustrated). The SoC 102 may include one or more electronic control units (ECUs), such as a CPU 104, NSP 106, and GPU(s) 108. In an example, the CPU 104 may include a processor 110 and memory 114 (e.g., L1 and/or L2 caches or registers or RAM), and may be controlled by an operating system 112 that is loaded from internal or external storage as data and instructions that are executable by the processor 110. The SoC 102 may further include or access a local database 116, which may be implemented in the memory 114, for example, where the database 116 can be used to maintain operational parameters and other information used to configure and operate the apparatus 100. The local database 116 may be implemented as a set of registers, or may be implemented in a database module, flash memory, magnetic media, non-volatile or persistent storage, optical media, tape, soft or hard disk, or the like. The SoC 102 may also be operably coupled to internal and/or external devices such as an antenna 120, a display/user interface 124, operator controls, such as buttons 128, 130, and other components.

A data communication interface (e.g., bus) 122 may be provided to support communication between the ECUs 104, 106, 108, and/or one or more peripherals (not shown). The data communication interface 122 may be operated in accordance with standard protocols defined for interconnecting certain components of mobile devices. For example, there may be multiple types of interfaces defined for communications between CPU 104, a user interface, and camera components of a mobile device.

Figure 2:
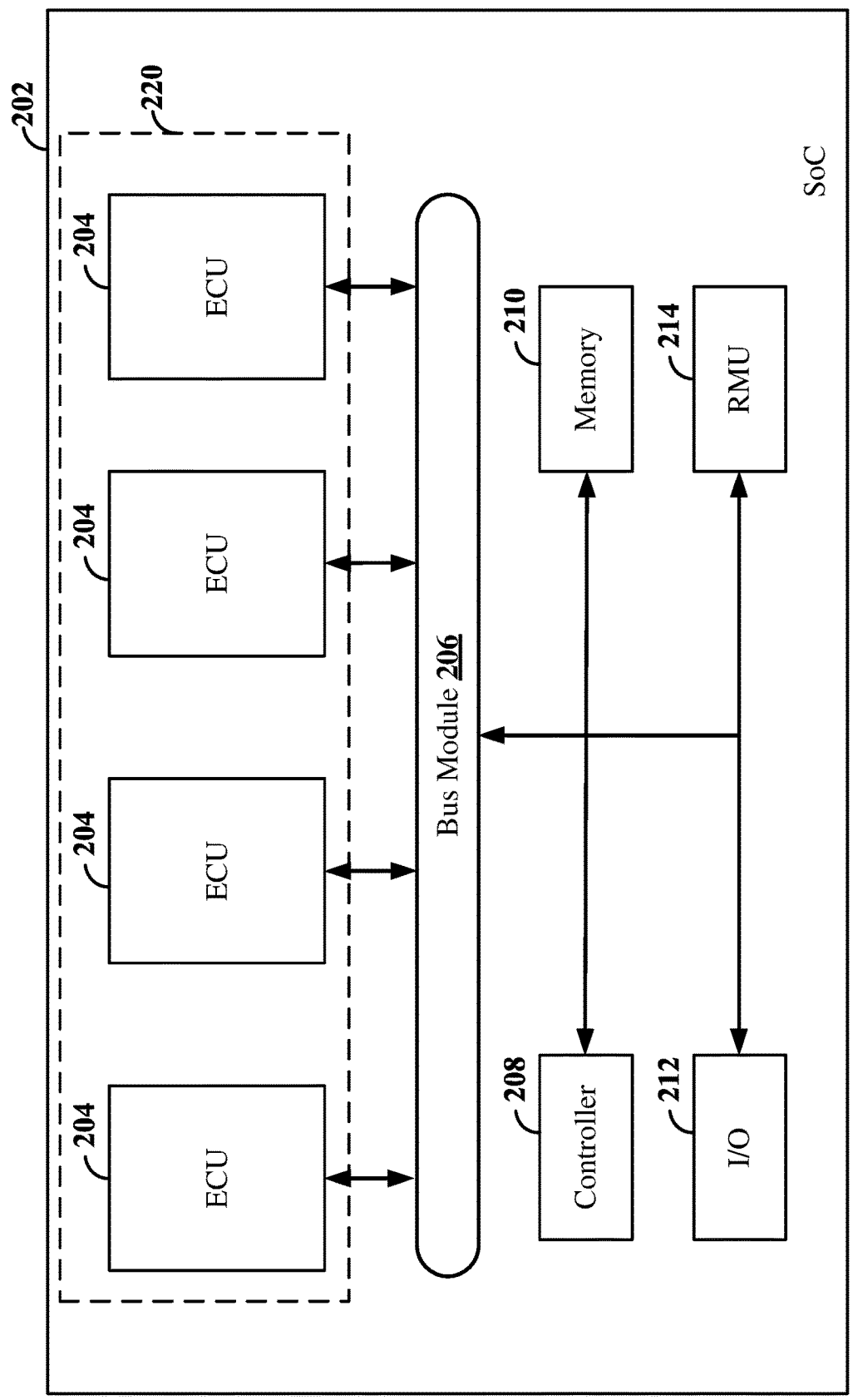
FIG. 2 is a diagram depicting an exemplary system-on-chip (SoC) according to some aspects.

FIG. 2 is a diagram depicting an exemplary system-on-chip (SoC) according to some aspects. The SoC 202 includes a processing system 220 that includes a plurality of heterogeneous electronic control units (ECUs) 204, such as CPUs, general-purpose processors, NSPs, GPUs, DDRs, modems, hardware accelerators, fixed function accelerators, image processors, display processors, secure processing units (SPUs), network processors, and other suitable ECU devices. The ECUs 204, may therefore, include one or more processors/cores, and each processor/core may perform operations independent of the other processors/cores. As such, each of the ECUs 204 may be configured to execute instructions to perform respective workloads.

The ECUs 204 may be organized in close proximity to one another (e.g., on a single substrate, die, integrated chip, etc.) so that they may operate at a much higher frequency/clock-rate than would be possible if the signals were to travel off-chip. The proximity of the processors/cores may also allow for the sharing of on-chip memory and resources (e.g., voltage rail), as well as for more coordinated cooperation between processors/cores. In some examples, one or more of the ECUs 204 may include a cluster of ECUs of the same type. For example, an ECU 204 may include a cluster of multiple (e.g., two or more) CPU cores with rail-sharing among the CPU cores. As another example, an ECU 204 may include an NSP core with multiple (e.g., two or more) threads.

The processing system 220 is interconnected with one or more controllers 208, one or more input/output (I/O) module(s) 212, one or more memories 210, and one or more resource management unit(s) (RMUs) 214 via a bus 206, which may include an array of reconfigurable logic gates and/or implement a bus architecture (e.g., CoreConnect, advanced microcontroller bus architecture (AMBA), etc.). The bus 206 communications may be provided by advanced interconnects, such as high performance networks on chip (NoCs). The bus 206 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. The bus 206 may include a multi-level bus system including, for example, one or more aggregate NoCs serving a plurality of clients (e.g., a plurality of ECUs 204), and one or more main NoCs serving the aggregate NoCs and one or more clients.

The controller 208 may be configured to manage the flow of data to and from the memory 210, an ECU memory 204, or a memory device located off-chip (e.g., a flash memory device). In some examples, the memory 210 may include a universal flash storage (UFS) host device configured to receive various memory commands from multiple masters, and address and communicate the memory commands to a memory device. The multiple masters may include ECUs 204, and/or multiple applications running on one or more of the ECUs 204. The controller 208 may include one or more processors configured to perform operations disclosed herein. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

In some examples, the controller 208 is an application processor that may be controlled by an operating system (e.g., a high-level operating system (HLOS)) that is loaded from internal or external storage as data and instructions that are executable by the controller 208. In some examples, the controller 208 may further be configured to execute a hypervisor software application to provide a supervisory capability over several operating systems (OSs), manage access to the ECUs 204, manage access to peripherals (e.g., via the I/O module 212), and manage inter-OS communication and security.

The memory 210 may, for example, maintain software, operational parameters and other information used to configure and operate the SoC 202. The memory 210 may be implemented, for example, as a set of registers, or may be implemented in a database module, flash memory, magnetic media, non-volatile or persistent storage, optical media, a smart card, a flash memory device, a random access memory (RAM), a read only memory (ROM), a programmable ROM (PROM), an erasable PROM (EPROM), an electrically erasable PROM (EEPROM), and/or any other suitable medium for storing software and/or instructions that may be accessed and read by the controller 208 and/or ECUs 204. In some examples, the memory 210 may include a cache memory to provide temporary storage of information to enhance the processing speed of the SoC 202.

The SoC may also be coupled to internal and/or external devices, such as a display, camera, operator controls (e.g., buttons and a keypad), cooling unit, navigation system, external memory device, and/or other peripheral devices and components via the input/output module 212. For example, the I/O module 212 may include an input/output interface (e.g., a bus architecture or interconnect) or a hardware design for performing I/O operations.

The RMU 214 is configured to manage voltages (e.g., retention, nominal, or off) on one or more core logic voltage rails (e.g., voltage rails configured to provide power to one or more ECUs 204 of the processing system 220 and the bus 206) and memory voltage rails (e.g., power rails configured to provide power to the controller 208 and the memory 210). The RMU 214 may also be configured to manage one or more clock sources configured to generate clock signals for one or more ECUs 204 of the processing system 220 and the bus 206. As such, the RMU 214 may be configured to manage components such as voltage rails, voltage regulators, oscillators, phase-locked loops, peripheral bridges, data controllers, system controllers, access ports, timers, and other similar components used to support the processors and software clients running on the SoC 202, or external to the SoC 202. The RMU 214 may be implemented by a combination of hardware and firmware. In some examples, the RMU 214 can be off-chip and external to the SoC 202.

In various aspects of the disclosure, the RMU 214 may be configured to operate together with the controller 208 to implement a thermal mitigation framework based on the power consumption of each of the ECUs 204. For example, the RMU 214 may be configured to apply one or more mitigation actions (e.g., frequency and/or clock throttling) to one or more of the ECUs 204 to mitigate the effects of heat produced by the ECUs 204.

Process variations in manufacturing can result in leakage current variations across SoCs and between corresponding ECUs in different SoCs of the same production line. These differences in leakage current can affect the power consumption of corresponding ECUs. For example, the power consumption may be higher in an ECU with a higher leakage current.

Figure 3:
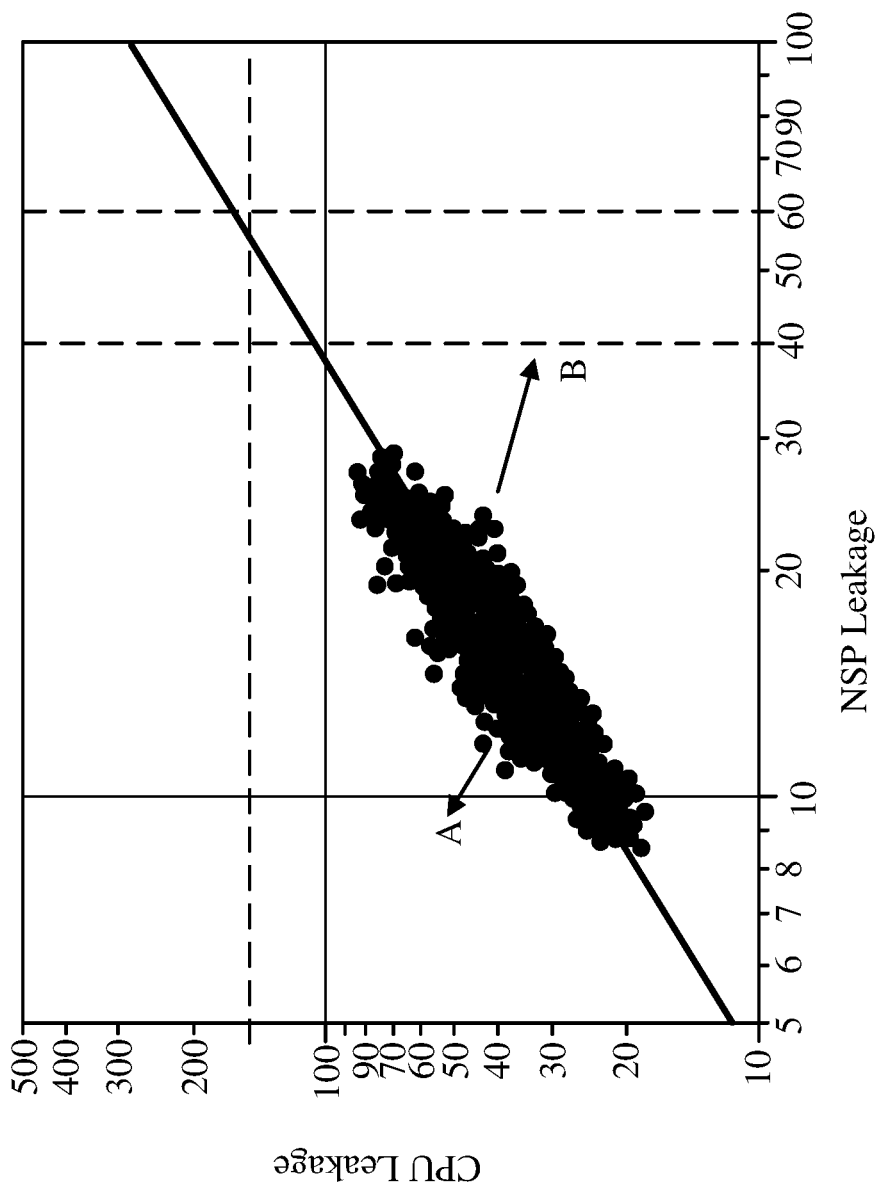
FIG. 3 is a graph depicting an example of leakage current across SoCs according to some aspects.

FIG. 3 is a graph depicting an example of leakage current across SoCs according to some aspects. In the graph shown in FIG. 3, each dot represents an SoC and the respective leakage currents (IDDQ) of an NSP and CPU on that SoC.

As can be seen in FIG. 3, the leakage current of CPUs may be greater in some SoCs (e.g., SoC A), while the leakage current of NSPs may be greater in other SoCs (e.g., SoC B). The differences in leakage currents between corresponding CPUs and corresponding NSPs on SoCs may result in different power consumptions by the CPUs and NSPs on the SoCs. For example, the CPU power of SoC A will be higher than the CPU power of SoC B. Similarly, the NSP power of SoC B will be higher than the NSP power of SoC A.

In addition, the leakage current varies with the junction temperature ($T_j$) of an ECU. The junction temperature refers to the highest operating temperature of the ECU (e.g., at a junction region of the ECU) and rises in proportion to the current consumption. Thus, as the junction temperature of an ECU increases, the leakage current of the ECU increases, and as a result, the ECU power also increases.

FIG. 4 is a diagram illustrating examples of power per electronic control unit (ECU) for SoCs according to some aspects. Three SoCs (SoC-A, SoC-B, and SoC-C) are shown in FIG. 4, each including a CPU, an NSP, and a GPU. The junction temperature 402 and corresponding power 404 of each of the CPUs, NSPs, and GPUs of each of the SoCs are also shown. For example, for SoC-A, the junction temperature 402 of the CPU is 55° C. with a corresponding power 404 of 1.4 W, the junction temperature 402 of the NSP is 60° C. with a corresponding power 404 of 0.8 W, and the junction temperature 402 of the GPU is 55° C. with a corresponding power 404 of 0.9 W. For SoC-B, the junction temperature 402 of the CPU is 55° C. with a corresponding power of 1.1 W, the junction temperature 402 of the NSP is 60° C. with a corresponding power 404 of 0.8 W, and the junction temperature 402 of the GPU is 55° C. with a corresponding power 404 of 0.9 W. For SoC-C, the junction temperature 402 of the CPU is 55° C. with a corresponding power of 0.8 W, the junction temperature 402 of the NSP is 60° C. with a corresponding power 404 of 1.0 W, and the junction temperature 402 of the GPU is 55° C. with a corresponding power 404 of 1.1 W.

If the thermal mitigation framework statically selects the CPU to throttle each time the skin temperature of the device exceeds the thermal framework, the thermal mitigation applied to SoC-C may not result in significant reductions in the skin temperature. This is due to the fact that the CPU is not the main power consumption source on the SoC-C. Instead, the GPU and NSP each consume more power than the CPU on SoC-C. Therefore, throttling the CPU on SoC-C may not sufficiently mitigate the heat produced by the SoC, and may further result in the CPU being unnecessarily throttled, thus affecting performance of the CPU and the SoC.

Therefore, various aspects are related to a power aware thermal mitigation framework configured to throttle ECUs on an SoC based on the respective power of each of the ECUs. For example, the ECU with the highest power may be throttled first to mitigate the heat on the SoC. In the example shown in FIG. 4, the CPU may be throttled first on SoC-A and SoC-B, but the GPU may be throttled first on SoC-C.

Figure 5:
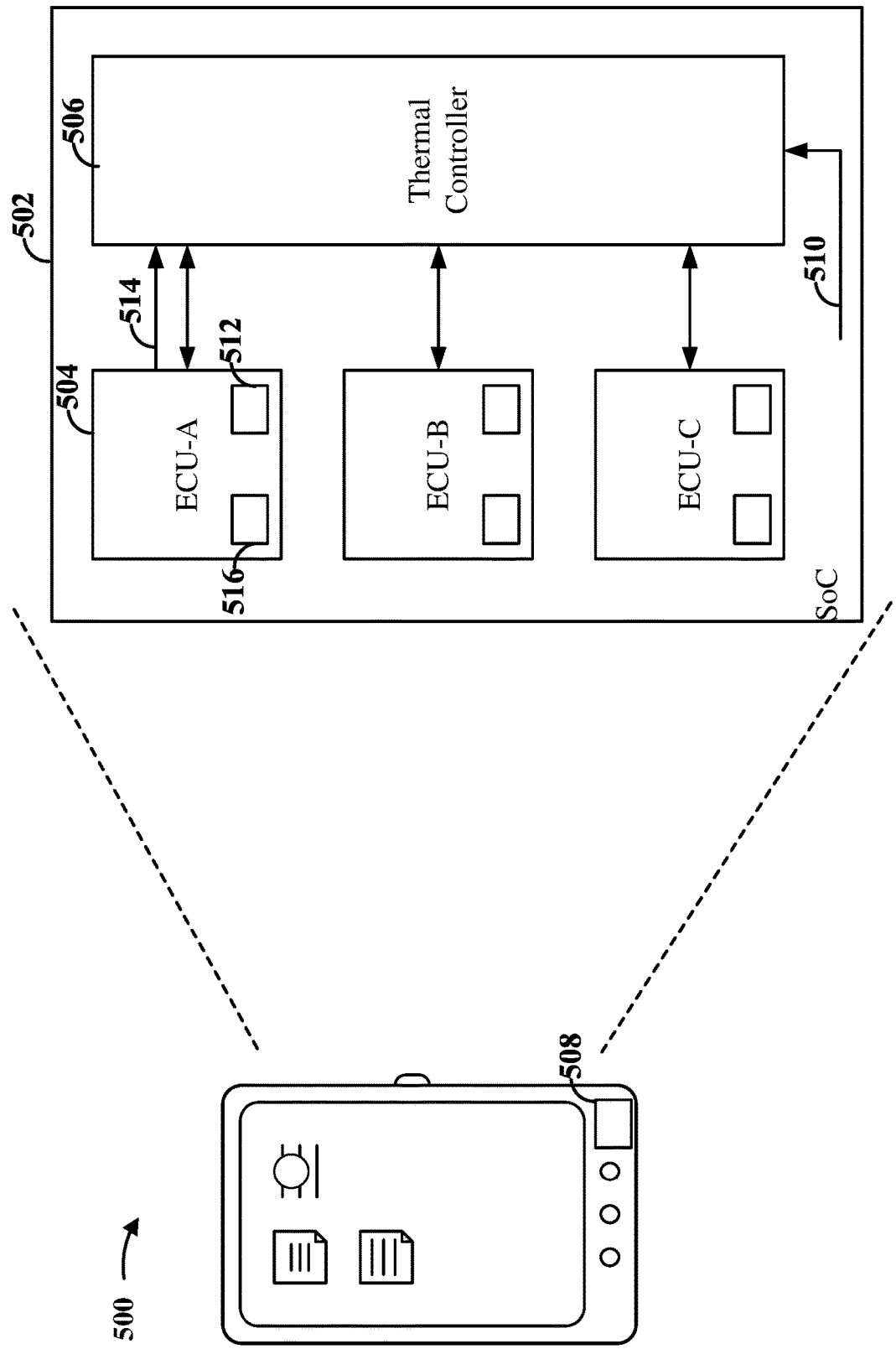
FIG. 5 is a diagram illustrating an example of a thermal framework for an SoC of an apparatus according to some aspects.

FIG. 5 is a diagram illustrating an example of a thermal framework for an SoC of an apparatus according to some aspects. In one example, the apparatus 500 may be a radio communication device (e.g., a UE) that includes an SoC 502 having a plurality of ECUs 504 (e.g., CPU, NSP, GPU, etc.) thereon. Each of the ECUs 504 (e.g., ECU-A, ECU-B, and ECU-C) may be coupled to a thermal controller 506, which may correspond, for example, to the RMU 214 and/or controller 208 shown in FIG. 2. The thermal controller 506 may be configured to implement a power aware thermal framework on the SoC 502.

The thermal controller 506 may be configured to receive, as input, a skin temperature 510 of the apparatus 500. In some examples, the skin temperature 510 may be measured by a thermistor 508 positioned near a surface of the apparatus 500. The thermal controller 506 may further be configured to compare the skin temperature 510 to a thermal limit of the apparatus 500 (e.g., a threshold), which may be stored, for example, on memory 210 shown in FIG. 2, a memory device external to the SoC, or other memory device. In response to the skin temperature 510 exceeding the threshold, the thermal controller 506 may be configured to apply one or more mitigation actions. For example, the thermal controller 506 may be configured to throttle the clock and/or frequency of one or more of the ECUs 504.

To identify the throttling victim(s), the thermal controller 506 may further be configured to calculate the respective power of each of the ECUs 504. The thermal controller 506 may then apply the mitigation action(s) to the ECUs 504 based on the respective power associated therewith. For example, the thermal controller 506 may apply a first thermal mitigation action (e.g., frequency throttling) to a first ECU 504 (e.g., ECU-A) having a highest power among each of the plurality of ECUs on the SoC 502. The thermal controller 506 may then update the power consumption of each of the ECUs 504 (e.g., re-calculate the power of each of the ECUs 504), and update the skin temperature 510 of the apparatus 500 (e.g., receive another skin temperature measurement from the thermistor 508). If the skin temperature 510 continues to exceed the thermal limit, the thermal controller 506 may then apply a second thermal mitigation action (e.g., clock throttling) to a second ECU 504 (e.g., ECU-B) having a highest power among the remaining ECUs on the SoC (e.g., ECUs other than the first ECU).

In some examples, the power of each ECU 504 may be calculated by adding a dynamic power of the ECU to a leakage power of the ECU. The dynamic power of an ECU (e.g., ECU-A) may be calculated based on a reference dynamic power ($P_{refdyn}$) associated with a reference ECU and a dynamic scaling factor for the ECU-A. The reference ECU corresponds to an ECU of the same type (e.g., if ECU-A is a CPU, the reference ECU is a CPU) on a reference SoC in a batch of SoCs (e.g., the same type of SoC manufactured on the same production line). The reference SoC is considered representative of all other SoCs on the production line. Therefore, tests performed on the reference SoC can be applied to all other SoCs on the production line.

Here, the reference dynamic power ($P_{refdyn}$) corresponds to the portion of the reference ECU power that is dynamic (e.g., that is not attributed to leakage). For example, the total reference ECU power may be measured at a predetermined temperature ($T_j$), and from the total reference ECU power, the reference dynamic power ($P_{refdyn}$) and a reference leakage power ($P_{refleak}$) may be determined (e.g., based on the IDDQ of the reference ECU). For example, the total measured reference ECU power may be 1000 mW, of which 900 mW may be dynamic power and 100 mW may be leakage power. Therefore, to determine the reference dynamic power ($P_{refdyn}$) and the reference leakage power ($P_{refleak}$), the reference IDDQ (reference leakage current) may further be measured at the predetermined temperature. In addition, a settling voltage ($V_{refCPR}$) of the reference ECU may also be measured.

The dynamic scaling factor applicable to ECU-A may be calculated based on the reference settling voltage ($V_{refCPR}$)

of the reference ECU and a device settling voltage ($V_{deviceCPR}$) of the ECU-A based on an operating frequency of the ECU-A. For example, the dynamic scaling factor may be calculated as:

$$\text{Dynamic Scaling Factor} = (V_{deviceCPR}/V_{refCPR})^2 \quad \text{(Equation 1)}$$

Similarly, the leakage power of the given ECU may be calculated based on the reference leakage power ($P_{refleak}$) of the reference ECU and a leakage scaling factor for the ECU-A at the junction temperature ($T_j$) of the ECU-A. The leakage scaling factor may be calculated based on both the device settling voltage ($V_{deviceCPR}$) of the ECU-A and the reference settling voltage ($V_{refCPR}$) of the reference ECU. In addition, the leakage scaling factor may be further be calculated based on a reference leakage current ($IDDQ_{ref}$) of the reference ECU and a device leakage current ($IDDQ_{device}$) of the ECU-A. For example, the leakage scaling factor may be calculated as:

$$\text{Leakage Scaling Factor} = \left(\frac{V_{deviceCPR}}{V_{refCPR}}\right)^2 * \left(\frac{IDDQ_{dev}}{IDDQ_{ref}}\right) \quad \text{(Equation 2)}$$

The leakage scaling factor at the junction temperature may then be calculated as:

$$\text{Leakage Scaling Factor}_{T_j} = \text{Leakage Scaling Factor} * T_j\text{Scaling}, \quad \text{(Equation 3)}$$

where $T_j$Scaling is a junction temperature scaling factor that scales the value of the device leakage current ($IDDQ_{dev}$) with the junction temperature ($T_j$) of the ECU-A. The total power of the ECU 504 (e.g., ECU-A) may then be calculated as follows:

$$ECU_{Power} = P_{refdyn} * \text{Dynamic Scaling Factor} + P_{refleak} * \text{Leakage Scaling Factor}_{T_j} \quad \text{(Equation 4)}$$

The junction temperature scaling factor ($T_j$Scaling) is based on a measured junction temperature ($T_j$) of the given ECU. In some examples, each of the ECUs 505 may include a respective thermal sensor 512 configured to measure a junction temperature ($T_j$) 514 of the respective ECU 504. The junction temperature 514 may then be provided to the thermal controller 506 to determine the junction temperature scaling factor and to calculate the total power of the ECU. For example, the thermal controller 506 may access a look-up table (LUT) of junction temperatures and corresponding junction temperature scaling factors to determine the junction temperature scaling factor for use in calculating the ECU power. In some examples, the $T_j$ Scaling LUT for an ECU (e.g., ECU-A) may be stored within a register 516 or other memory device on the ECU-A. The register 516 may further store other thermal parameters that may be accessed by the thermal controller 506 to calculate the power of an ECU.

Figure 6:
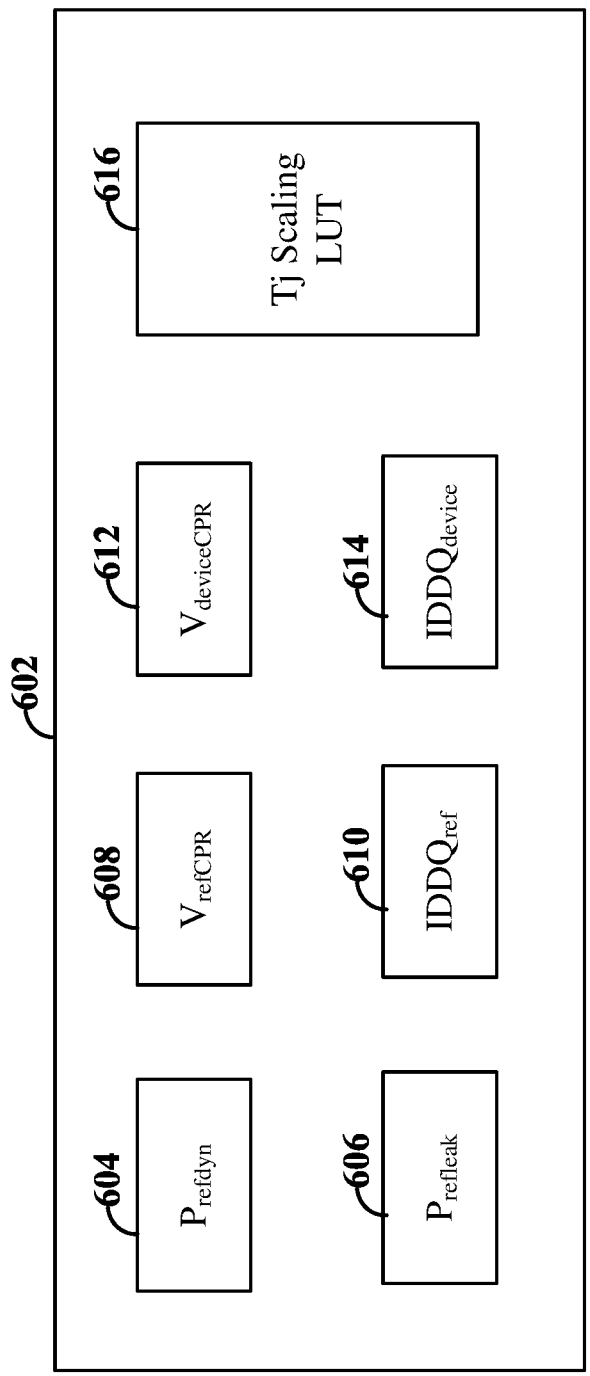
FIG. 6 is a diagram illustrating an example of thermal parameters maintained on an ECU according to some aspects.

FIG. 6 is a diagram illustrating an example of thermal parameters maintained on an ECU according to some aspects. In the example shown in FIG. 6, a register 602 (or other memory device) on an ECU is configured to store various thermal parameters, including, but not limited to $P_{refdyn}$ 604, $P_{refleak}$ 606, $V_{refCPR}$ 608, $IDDQ_{ref}$ 610, $V_{deviceCPR}$ 612, $IDDQ_{device}$ 614, and a $T_j$ Scaling LUT 616. Each of these thermal parameters may be fused into the register 602 during manufacturing of the SoC.

Figure 7:
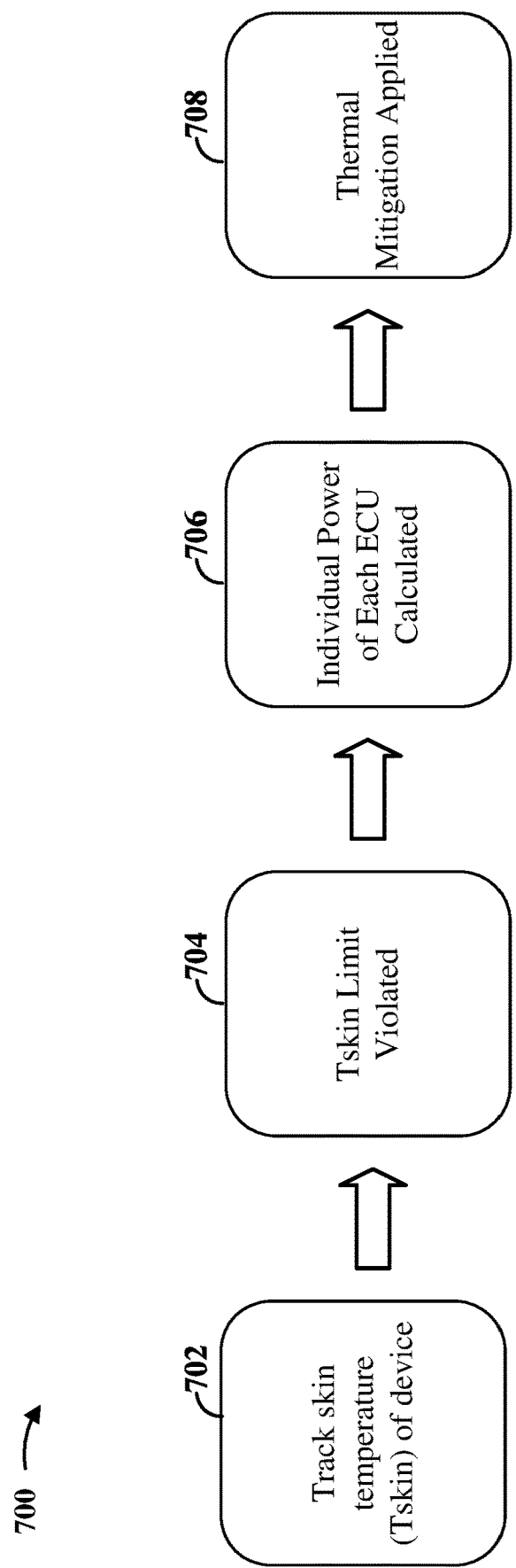
FIG. 7 is a diagram illustrating an exemplary process flow for thermal mitigation of an SoC according to some aspects.

FIG. 7 is a diagram illustrating an exemplary process flow for thermal mitigation of an SoC according to some aspects. As described below, some or all illustrated features may be omitted in a particular implementation within the scope of the present disclosure, and some illustrated features may not be required for implementation of all embodiments. In some examples, the process 700 may be carried out by the thermal controller 506 illustrated in FIG. 5. In some examples, the process 700 may be carried out by any suitable apparatus or means for carrying out the functions or algorithm described below.

At block 702, the process begins with tracking the skin temperature (Tskin) of a device (e.g., a mobile device). For example, the thermal controller 506 and thermistor 508 shown and described above in connection with FIG. 5 may provide a means to track Tskin.

At block 704, the process continues with determining that a skin temperature limit (Tskin limit) has been violated. In some examples, the measured Tskin may be compared with a threshold (e.g., Tskin limit) and if Tskin exceeds Tskin limit, a determination is made that the Tskin limit is violated. For example, the thermal controller 506 shown and described above in connection with FIG. 5 may provide a means to determine that Tskin has been violated.

At block 706, the individual power of each ECU on an SoC is calculated. For example, the power of each ECU may be calculated by adding a dynamic power of the ECU to a leakage power of the ECU, as described above. For example, the thermal controller 506 shown and described above in connection with FIG. 5 may provide a means to calculate the power of each ECU.

At block 708, thermal mitigation may be applied to the SoC. For example, one or more thermal mitigation actions may be applied to one or more ECUs based on the respective power of each of the ECUs. the thermal controller 506 shown and described above in connection with FIG. 5 may provide a means to apply thermal mitigation to the SoC.

Figure 8:
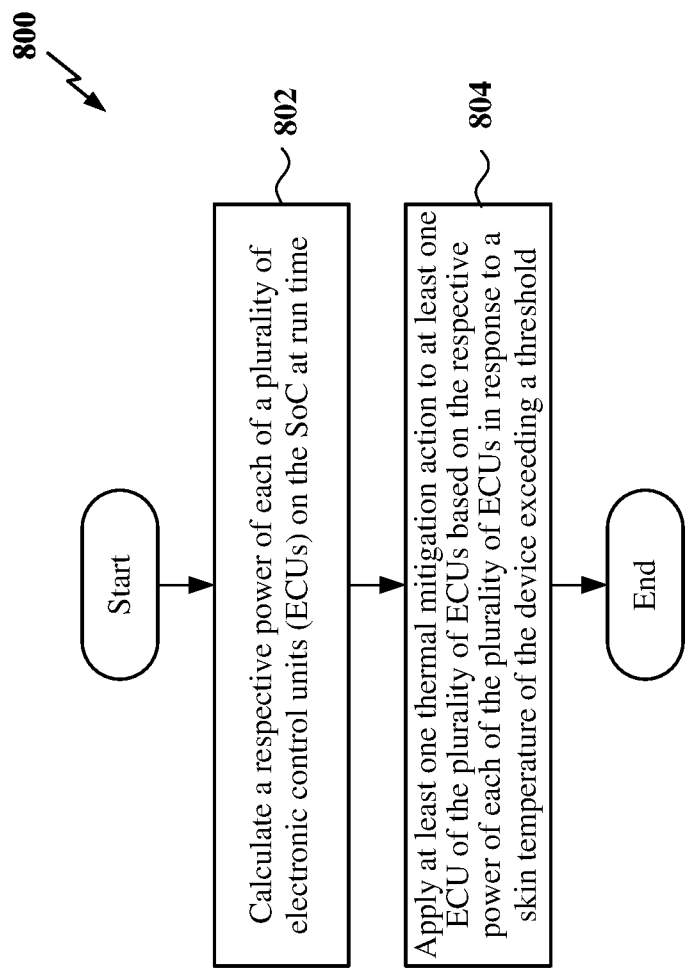
FIG. 8 is a flow chart illustrating an exemplary process for thermal mitigation of an SoC according to some aspects.

FIG. 8 is a diagram illustrating an exemplary process flow for thermal mitigation of an SoC according to some aspects. As described below, some or all illustrated features may be omitted in a particular implementation within the scope of the present disclosure, and some illustrated features may not be required for implementation of all embodiments. In some examples, the process 800 may be carried out by the thermal controller 506 illustrated in FIG. 5. In some examples, the process 800 may be carried out by any suitable apparatus or means for carrying out the functions or algorithm described below.

At block 802, the process begins with calculating a respective power of each of a plurality of electronic control units (ECUs) on the SoC at run time. For example, the thermal controller 506 shown and described above in connection with FIG. 5 may provide a means to calculate the respective power of each of the ECUs.

In some examples, the thermal controller may calculate a respective dynamic power of each of the plurality of ECUs, calculate a respective leakage power of each of the plurality of ECUs, and add the respective dynamic power to the respective leaker power to produce the respective power of each of the plurality of ECUs. For example, the thermal controller may calculate the respective dynamic power of each of the plurality of ECUs based on a respective reference dynamic power for each of the plurality of ECUs and a respective dynamic scaling factor for each of the plurality of ECUs. Here, the respective reference dynamic power for each of the plurality of ECUs is associated with a respective reference ECU for each of the plurality of ECUs. The respective reference dynamic power may be stored on the respective ECU.

In some examples, the thermal controller may identify a respective reference settling voltage and a respective device settling voltage for each of the plurality of ECUs based on a respective operating frequency of each of the plurality of ECUs and calculate the respective dynamic scaling factor of each of the plurality of ECUs based on the respective reference settling voltage and the respective device settling voltage. Here, the respective reference settling voltage is associated with the respective reference ECU and stored on the respective ECU. In addition, the respective device settling voltage is associated with the respective ECU and stored on the respective ECU.

In some examples, the thermal controller may calculate the respective leakage power of each of the plurality of ECUs based on a respective reference leakage power for each of the plurality of ECUs and a respective leakage scaling factor for each of the plurality of ECUs. Here, the respective reference leakage power for each of the plurality of ECUs is associated with a respective reference ECU for each of the plurality of ECUs. The respective reference leakage power may be stored on the respective ECU.

In some examples, the thermal controller may identify a respective reference leakage current associated with the respective reference ECU and a respective device leakage current associated with the respective ECU for each of the plurality of ECUs based on a respective junction temperature of each of the plurality of ECUs. The thermal controller may then calculate the respective leakage scaling factor of each of the plurality of ECUs based on the respective reference settling voltage, the respective device settling voltage, the respective reference leakage current, and the respective device leakage current.

In some examples, the thermal controller may calculate a respective fraction of the respective device leakage current to the respective reference leakage current for each of the plurality of ECUs and multiply a respective junction temperature scaling factor to the respective fraction.

At block 804, the process continues with applying at least one thermal mitigation action to at least one ECU of the plurality of ECUs based on the respective power of each of the plurality of ECUs in response to a skin temperature of the device exceeding a threshold. For example, the at least one thermal mitigation action may include at least one of throttling an operating frequency or throttling a clock of the at least one ECU. For example, the thermal controller 506 shown and described above in connection with FIG. 5 may provide a means to apply the at least one thermal mitigation action.

In some examples, the thermal controller may apply a first thermal mitigation action to a first ECU of the plurality of ECUs, a first power of the first ECU being higher than the respective power of other ECUs of the plurality of ECUs. The thermal controller may then update the respective power of each of the plurality of ECUs on the SoC based on the first thermal mitigation action to produce a respective updated power of each of the plurality of ECUs and apply a second thermal mitigation action to a second ECU of the plurality of ECUs based on the respective updated power of each of the plurality of ECUs and in response to the skin temperature of the device continuing to exceed the threshold. Here, a second power of the second ECU is higher than the respective power of remaining ECUs of the plurality of ECUs.

Figure 9:
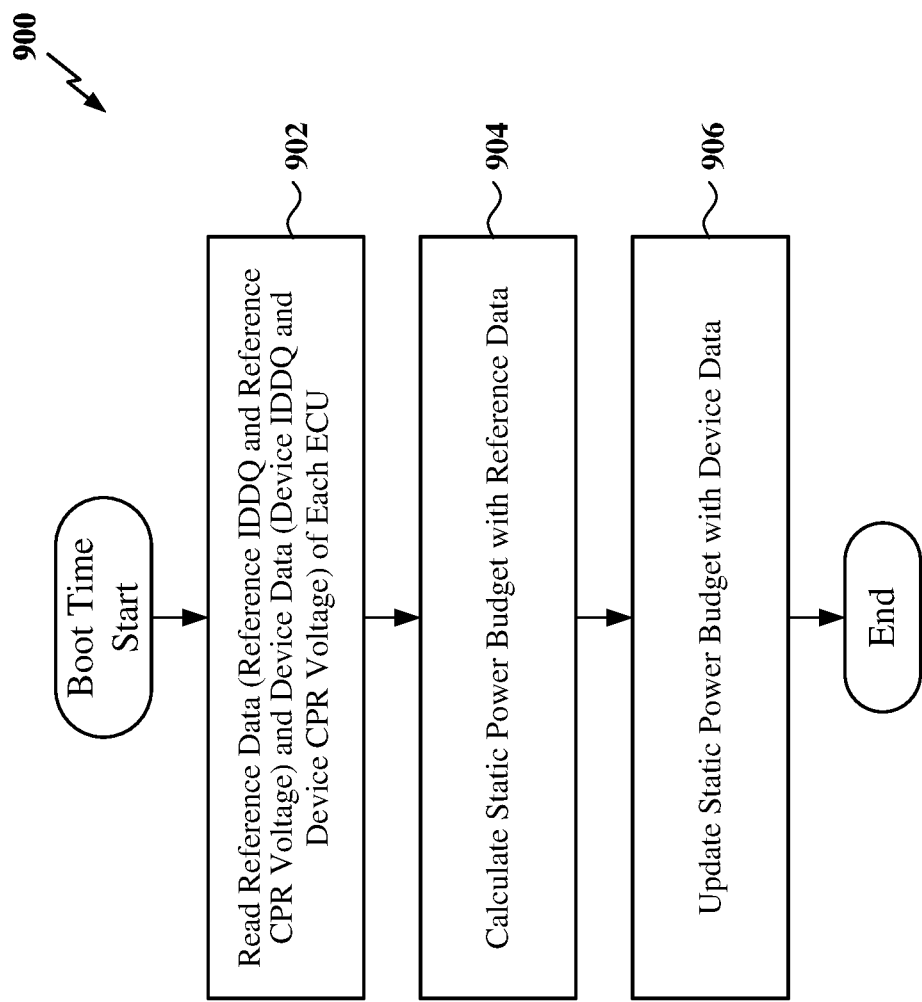
FIG. 9 is a flow chart illustrating an exemplary process for thermal management of an SoC at boot up according to some aspects.

FIG. 9 is a flow chart illustrating an exemplary process for thermal management of an SoC at boot up according to some aspects. As described below, some or all illustrated features may be omitted in a particular implementation within the scope of the present disclosure, and some illustrated features may not be required for implementation of all embodiments. In some examples, the process 900 may be carried out by the thermal controller 506 illustrated in FIG. 5. In some examples, the process 900 may be carried out by any suitable apparatus or means for carrying out the functions or algorithm described below.

At block 902, the process begins with reading reference data (Reference IDDQ and Reference CPR Voltage) and device data (Device IDDQ and Device CPR Voltage) of each ECU on an SoC of a device (e.g., a mobile device). The reference data and device data for each ECU may be stored, for example, in a register or other memory device of the ECU. For example, the thermal controller 506 shown and described above in connection with FIG. 5 may provide a means to read the reference data and device data.

At block 904, the process continues with calculating the static power budget of the SoC with the reference data. The static power budget is equal to the sum of the individual power required by each of the ECUs on the SoC. Using the reference data, an initial power budget for the SoC may be calculated. For example, the thermal controller 506 shown and described above in connection with FIG. 5 may provide a means to calculate the static power budget.

At block 906, the static power budget may be updated with the device data. For example, using Equation 4 above, the static power at boot up for a preconfigured or initial Tj may be computed for each ECU to update the static power budget. For example, the thermal controller 506 shown and described above in connection with FIG. 5 may provide a means to update the static power budget.

Figure 10:
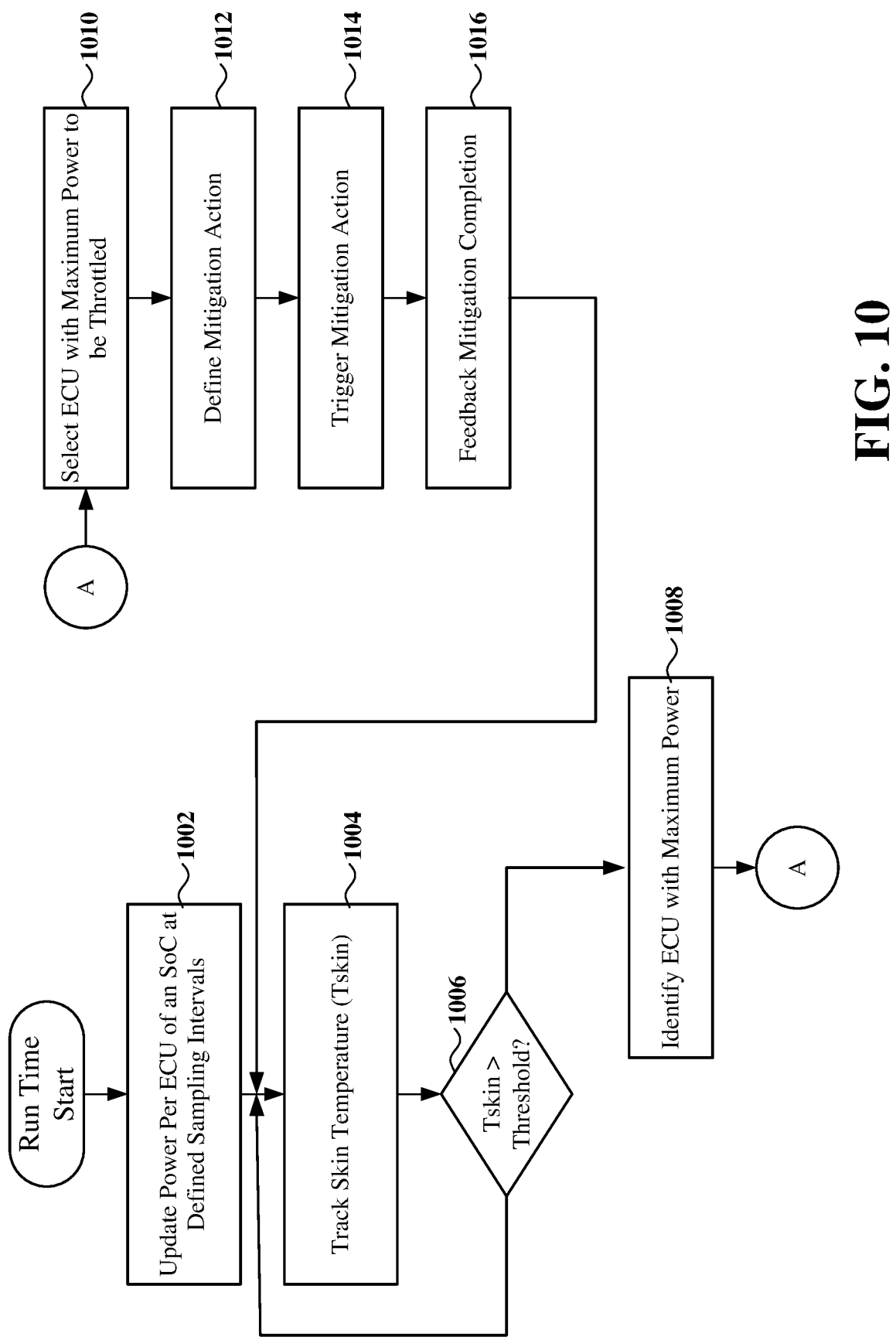
FIG. 10 is a flow chart illustrating another exemplary process for thermal management of an SoC at run time according to some aspects.

FIG. 10 is a flow chart illustrating another exemplary process for thermal management of an SoC at run time according to some aspects. As described below, some or all illustrated features may be omitted in a particular implementation within the scope of the present disclosure, and some illustrated features may not be required for implementation of all embodiments. In some examples, the process 1000 may be carried out by the thermal controller 506 illustrated in FIG. 5. In some examples, the process 1000 may be carried out by any suitable apparatus or means for carrying out the functions or algorithm described below.

At block 1002, the process begins with updating the power per ECU of an SoC at defined sampling intervals. The power per ECU may be calculated using, for example, Equation 4 above. The power per ECU may be periodically updated at the predefined sampling intervals and/or may be dynamically updated in response to one or more triggers. For example, performance of a thermal mitigation action may trigger re-calculation of the power per ECU. For example, the thermal controller 506 shown and described above in connection with FIG. 5 may provide a means to update the power per ECU.

At block 1004, the process continues with tracking the skin temperature (Tskin) of the device/apparatus (e.g., mobile device) including the SoC. For example, the thermal controller 506 and thermistor 508 shown and described above in connection with FIG. 5 may provide a means to track the skin temperature of the device.

At block 1006, the skin temperature (Tskin) is compared to a threshold (Tskin limit) to determine whether Tskin exceeds the threshold. If the skin temperature does exceed the threshold (Y branch of block 1006), at block 1008, the ECU with the maximum power (as determined in block 1002) is identified. For example, the thermal controller 506 shown and described above in connection with FIG. 5 may provide a means to select an ECU with the maximum power in response to the skin temperature exceeding the threshold.

At block 1010, the ECU identified as having the maximum power is selected for throttling (e.g., for mitigation), and at block 1012, a mitigation action is defined. For example, the mitigation action may include throttling one or more of the frequency or clock of the selected ECU. For example, the thermal controller 506 shown and described above in connection with FIG. 5 may provide a means to select the ECU for throttling and define a mitigation action to be applied to the selected ECU.

At block 1014, the mitigation action is triggered (e.g., throttling of the selected ECU is triggered). For example, the thermal controller 506 shown and described above in connection with FIG. 5 may provide a means to trigger the mitigation action. At block 1016, feedback may be received indicating completion of the mitigation action. For example, the thermal controller 506 shown and described above in connection with FIG. 5 may provide a means to receive the mitigation complete feedback (e.g., from the RMU shown in FIG. 2 and/or other throttling device).

The process then returns to block 1004, where the skin temperature is tracked. If the skin temperature continues to exceed the threshold at block 1006, another ECU with the maximum power (e.g., as updated at block 1002 after mitigation) is identified and selected for mitigation at blocks 1008 and 1010. The process continues until the skin temperature does not exceed the threshold (e.g., the skin temperature limit is no longer exceeded).

In one configuration, an apparatus includes means for calculating a respective power of each of a plurality of electronic control units (ECUs) on the SoC at run time and means for applying at least one thermal mitigation action to at least one ECU of the plurality of ECUs based on the respective power of each of the plurality of ECUs in response to a skin temperature of the device exceeding a threshold. In one aspect, the aforementioned means may be the controller 208, RMU 214, and memory 210 shown in FIG. 2 and/or the thermal controller 506 shown in FIG. 5 configured to perform the functions recited by the aforementioned means. In another aspect, the aforementioned means may be a circuit or any apparatus configured to perform the functions recited by the aforementioned means.

Of course, in the above examples, the controller is merely provided as an example, and other means for carrying out the described functions may be included within various aspects of the present disclosure, including any other suitable apparatus or means described in any one of the FIGS. 1, 2, 5, and/or 6, and utilizing, for example, the processes and/or algorithms described herein in relation to FIGS. 7-10.

The following provides an overview of aspects of the present disclosure:

Aspect 1: A method of thermal mitigation on a system-on-chip (SoC) of a device, the method comprising: calculating a respective power of each of a plurality of electronic control units (ECUs) on the SoC at run time; and applying at least one thermal mitigation action to at least one ECU of the plurality of ECUs based on the respective power of each of the plurality of ECUs in response to a skin temperature of the device exceeding a threshold.

Aspect 2: The method of aspect 1, wherein the applying the at least one thermal mitigation action further comprises: applying a first thermal mitigation action to a first ECU of the plurality of ECUs, a first power of the first ECU being higher than the respective power of other ECUs of the plurality of ECUs.

Aspect 3: The method of aspect 2, further comprising: updating the respective power of each of the plurality of ECUs on the SoC based on the first thermal mitigation action to produce a respective updated power of each of the plurality of ECUs; and applying a second thermal mitigation action to a second ECU of the plurality of ECUs based on the respective updated power of each of the plurality of ECUs and in response to the skin temperature of the device continuing to exceed the threshold, a second power of the second ECU being higher than the respective power of remaining ECUs of the plurality of ECUs.

Aspect 4: The method of any of aspects 1 through 3, wherein the calculating the respective power of the plurality of ECUs further comprises: calculating a respective dynamic power of each of the plurality of ECUs; calculating a respective leakage power of each of the plurality of ECUs; and adding the respective dynamic power to the respective leaker power to produce the respective power of each of the plurality of ECUs.

Aspect 5: The method of aspect 4, wherein the calculating the respective dynamic power of each of the plurality of ECUs further comprises: calculating the respective dynamic power of each of the plurality of ECUs based on a respective reference dynamic power for each of the plurality of ECUs and a respective dynamic scaling factor for each of the plurality of ECUs, wherein the respective reference dynamic power for each of the plurality of ECUs is associated with a respective reference ECU for each of the plurality of ECUs, the respective reference dynamic power being stored on the respective ECU.

Aspect 6: The method of aspect 5, further comprising: identifying a respective reference settling voltage and a respective device settling voltage for each of the plurality of ECUs based on a respective operating frequency of each of the plurality of ECUs, the respective reference settling voltage being associated with the respective reference ECU and stored on the respective ECU, the respective device settling voltage being associated with the respective ECU and stored on the respective ECU; and calculating the respective dynamic scaling factor of each of the plurality of ECUs based on the respective reference settling voltage and the respective device settling voltage.

Aspect 7: The method of any of aspects 4 through 6, wherein the calculating the respective leakage power of each of the plurality of ECUs further comprises: calculating the respective leakage power of each of the plurality of ECUs based on a respective reference leakage power for each of the plurality of ECUs and a respective leakage scaling factor for each of the plurality of ECUs, wherein the respective reference leakage power for each of the plurality of ECUs is associated with a respective reference ECU for each of the plurality of ECUs, the respective reference leakage power being stored on the respective ECU.

Aspect 8: The method of aspect 7, further comprising: identifying a respective reference settling voltage and a respective device settling voltage for each of the plurality of ECUs based on a respective operating frequency of each of the plurality of ECUs, the respective reference settling voltage being associated with the respective reference ECU and stored on the respective ECU of the plurality of ECUs, the respective device settling voltage being associated with the respective ECU and stored on the respective ECU; identifying a respective reference leakage current associated with the respective reference ECU and a respective device leakage current associated with the respective ECU for each of the plurality of ECUs based on a respective junction temperature of each of the plurality of ECUs; and calculating the respective leakage scaling factor of each of the plurality of ECUs based on the respective reference settling voltage, the respective device settling voltage, the respective reference leakage current, and the respective device leakage current.

Aspect 9: The method of aspect 8, wherein the calculating the respective leakage scaling factor for each of the plurality of ECUs further comprises: calculating a respective fraction of the respective device leakage current to the respective reference leakage current for each of the plurality of ECUs; and multiplying a respective junction temperature scaling factor to the respective fraction.

Aspect 10: The method of any of aspects 1 through 9, wherein the at least one thermal mitigation action comprises at least one of throttling an operating frequency or throttling a clock of the at least one ECU.

Aspect 11: An apparatus, comprising: a plurality of electronic control units (ECUs) on a system-on-chip (SoC); and a thermal controller configured to perform the method of any of aspects 1 through 10.

Aspect 12: A system-on-chip (SoC) of a device, comprising at least one means for performing a method of any of aspects 1 through 10.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-10 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 5, and/or 6 may be configured to perform one or more of the methods, features, or steps described herein. The novel algorithms described herein may also be efficiently implemented in software and/or embedded in hardware.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. An apparatus, comprising:
a plurality of electronic control units (ECUs) on a system-on-chip (SoC); and
a thermal controller configured to calculate a respective power of each of a plurality of electronic control units (ECUs) on the SoC at run time and to apply at least one thermal mitigation action to at least one ECU of the plurality of ECUs based on the respective power of each of the plurality of ECUs in response to a skin temperature of the apparatus exceeding a threshold, wherein the thermal controller is further configured to:
calculate a respective dynamic power of each of the plurality of ECUs,
calculate a respective leakage power of each of the plurality of ECUs, and
add the respective dynamic power to the respective leakage power to produce the respective power of each of the plurality of ECUs.

2. The apparatus of claim 1, wherein the thermal controller is further configured to:
apply a first thermal mitigation action to a first ECU of the plurality of ECUs, a first power of the first ECU being higher than the respective power of other ECUs of the plurality of ECUs.

3. The apparatus of claim 2, wherein the thermal controller is further configured to:
  update the respective power of each of the plurality of ECUs on the SoC based on the first thermal mitigation action to produce a respective updated power of each of the plurality of ECUs; and
  apply a second thermal mitigation action to a second ECU of the plurality of ECUs based on the respective updated power of each of the plurality of ECUs and in response to the skin temperature of the apparatus continuing to exceed the threshold, a second power of the second ECU being higher than the respective power of remaining ECUs of the plurality of ECUs.

4. The apparatus of claim 1, wherein the thermal controller is further configured to:
  calculate the respective dynamic power of each of the plurality of ECUs based on a respective reference dynamic power for each of the plurality of ECUs and a respective dynamic scaling factor for each of the plurality of ECUs,
  wherein the respective reference dynamic power for each of the plurality of ECUs is associated with a respective reference ECU for each of the plurality of ECUs, the respective reference dynamic power being stored on the respective ECU.

5. The apparatus of claim 4, wherein the thermal controller is further configured to:
  identify a respective reference settling voltage and a respective device settling voltage for each of the plurality of ECUs based on a respective operating frequency of each of the plurality of ECUs, the respective reference settling voltage being associated with the respective reference ECU and stored on the respective ECU, the respective device settling voltage being associated with the respective ECU and stored on the respective ECU; and
  calculate the respective dynamic scaling factor of each of the plurality of ECUs based on the respective reference settling voltage and the respective device settling voltage.

6. The apparatus of claim 1, wherein the thermal controller is further configured to:
  calculate the respective leakage power of each of the plurality of ECUs based on a respective reference leakage power for each of the plurality of ECUs and a respective leakage scaling factor for each of the plurality of ECUs,
  wherein the respective reference leakage power for each of the plurality of ECUs is associated with a respective reference ECU for each of the plurality of ECUs, the respective reference leakage power being stored on the respective ECU.

7. The apparatus of claim 6, wherein the thermal controller is further configured to:
  identify a respective reference settling voltage and a respective device settling voltage for each of the plurality of ECUs based on a respective operating frequency of each of the plurality of ECUs, the respective reference settling voltage being associated with the respective reference ECU and stored on the respective ECU of the plurality of ECUs, the respective device settling voltage being associated with the respective ECU and stored on the respective ECU;
  identify a respective reference leakage current associated with the respective reference ECU and a respective device leakage current associated with the respective ECU for each of the plurality of ECUs based on a respective junction temperature of each of the plurality of ECUs; and
  calculate the respective leakage scaling factor of each of the plurality of ECUs based on the respective reference settling voltage, the respective device settling voltage, the respective reference leakage current, and the respective device leakage current.

8. The apparatus of claim 7, wherein the thermal controller is further configured to:
  calculate a respective fraction of the respective device leakage current to the respective reference leakage current for each of the plurality of ECUs; and
  multiply a respective junction temperature scaling factor to the respective fraction.

9. The apparatus of claim 1, wherein the at least one thermal mitigation action comprises at least one of throttling an operating frequency or throttling a clock of the at least one ECU.

10. A method of thermal mitigation on a system-on-chip (SoC) of a device, the method comprising:
  calculating a respective power of each of a plurality of electronic control units (ECUs) on the SoC at run time, wherein the calculating the respective power of each of the plurality of ECUs comprises:
    calculating a respective dynamic power of each of the plurality of ECUs,
    calculating a respective leakage power of each of the plurality of ECUs, and
    adding the respective dynamic power to the respective leakage power to produce the respective power of each of the plurality of ECUs; and
  applying at least one thermal mitigation action to at least one ECU of the plurality of ECUs based on the respective power of each of the plurality of ECUs in response to a skin temperature of the device exceeding a threshold.

11. The method of claim 10, wherein the applying the at least one thermal mitigation action further comprises:
  applying a first thermal mitigation action to a first ECU of the plurality of ECUs, a first power of the first ECU being higher than the respective power of other ECUs of the plurality of ECUs.

12. The method of claim 11, further comprising:
  updating the respective power of each of the plurality of ECUs on the SoC based on the first thermal mitigation action to produce a respective updated power of each of the plurality of ECUs; and
  applying a second thermal mitigation action to a second ECU of the plurality of ECUs based on the respective updated power of each of the plurality of ECUs and in response to the skin temperature of the device continuing to exceed the threshold, a second power of the second ECU being higher than the respective power of remaining ECUs of the plurality of ECUs.

13. The method of claim 10, wherein the calculating the respective dynamic power of each of the plurality of ECUs further comprises:
  calculating the respective dynamic power of each of the plurality of ECUs based on a respective reference dynamic power for each of the plurality of ECUs and a respective dynamic scaling factor for each of the plurality of ECUs,
  wherein the respective reference dynamic power for each of the plurality of ECUs is associated with a respective reference ECU for each of the plurality of ECUs, the respective reference dynamic power being stored on the respective ECU.

14. The method of claim 13, further comprising:
identifying a respective reference settling voltage and a respective device settling voltage for each of the plurality of ECUs based on a respective operating frequency of each of the plurality of ECUs, the respective reference settling voltage being associated with the respective reference ECU and stored on the respective ECU, the respective device settling voltage being associated with the respective ECU and stored on the respective ECU; and
calculating the respective dynamic scaling factor of each of the plurality of ECUs based on the respective reference settling voltage and the respective device settling voltage.

15. The method of claim 10, wherein the calculating the respective leakage power of each of the plurality of ECUs further comprises:
calculating the respective leakage power of each of the plurality of ECUs based on a respective reference leakage power for each of the plurality of ECUs and a respective leakage scaling factor for each of the plurality of ECUs,
wherein the respective reference leakage power for each of the plurality of ECUs is associated with a respective reference ECU for each of the plurality of ECUs, the respective reference leakage power being stored on the respective ECU.

16. The method of claim 15, further comprising:
identifying a respective reference settling voltage and a respective device settling voltage for each of the plurality of ECUs based on a respective operating frequency of each of the plurality of ECUs, the respective reference settling voltage being associated with the respective reference ECU and stored on the respective ECU of the plurality of ECUs, the respective device settling voltage being associated with the respective ECU and stored on the respective ECU;
identifying a respective reference leakage current associated with the respective reference ECU and a respective device leakage current associated with the respective ECU for each of the plurality of ECUs based on a respective junction temperature of each of the plurality of ECUs; and
calculating the respective leakage scaling factor of each of the plurality of ECUs based on the respective reference settling voltage, the respective device settling voltage, the respective reference leakage current, and the respective device leakage current.

17. The method of claim 16, wherein the calculating the respective leakage scaling factor for each of the plurality of ECUs further comprises:
calculating a respective fraction of the respective device leakage current to the respective reference leakage current for each of the plurality of ECUs; and
multiplying a respective junction temperature scaling factor to the respective fraction.

18. The method of claim 10, wherein the at least one thermal mitigation action comprises at least one of throttling an operating frequency or throttling a clock of the at least one ECU.

19. A system-on-chip (SoC) of a device, comprising:
means for calculating a respective power of each of a plurality of electronic control units (ECUs) on the SoC at run time, wherein the means for calculating the respective power of each of the plurality of ECUs comprises:
means for calculating a respective dynamic power of each of the plurality of ECUs,
means for calculating a respective leakage power of each of the plurality of ECUs, and
means for adding the respective dynamic power to the respective leakage power to produce the respective power of each of the plurality of ECUs; and
means for applying at least one thermal mitigation action to at least one ECU of the plurality of ECUs based on the respective power of each of the plurality of ECUs in response to a skin temperature of the device exceeding a threshold.

20. The SoC of claim 19, wherein the means for applying the at least one thermal mitigation action further comprises:
means for applying a first thermal mitigation action to a first ECU of the plurality of ECUs, a first power of the first ECU being higher than the respective power of other ECUs of the plurality of ECUs.

21. The SoC of claim 20, further comprising:
means for updating the respective power of each of the plurality of ECUs on the SoC based on the first thermal mitigation action to produce a respective updated power of each of the plurality of ECUs; and
means for applying a second thermal mitigation action to a second ECU of the plurality of ECUs based on the respective updated power of each of the plurality of ECUs and in response to the skin temperature of the device continuing to exceed the threshold, a second power of the second ECU being higher than the respective power of remaining ECUs of the plurality of ECUs.

22. The SoC of claim 19, wherein the means for calculating the respective dynamic power of each of the plurality of ECUs further comprises:
means for calculating the respective dynamic power of each of the plurality of ECUs based on a respective reference dynamic power for each of the plurality of ECUs and a respective dynamic scaling factor for each of the plurality of ECUs,
wherein the respective reference dynamic power for each of the plurality of ECUs is associated with a respective reference ECU for each of the plurality of ECUs, the respective reference dynamic power being stored on the respective ECU.

23. The SoC of claim 22, further comprising:
means for identifying a respective reference settling voltage and a respective device settling voltage for each of the plurality of ECUs based on a respective operating frequency of each of the plurality of ECUs, the respective reference settling voltage being associated with the respective reference ECU and stored on the respective ECU, the respective device settling voltage being associated with the respective ECU and stored on the respective ECU; and
means for calculating the respective dynamic scaling factor of each of the plurality of ECUs based on the respective reference settling voltage and the respective device settling voltage.

24. The SoC of claim 19, wherein the means for calculating the respective leakage power of each of the plurality of ECUs further comprises:
means for calculating the respective leakage power of each of the plurality of ECUs based on a respective reference leakage power for each of the plurality of ECUs and a respective leakage scaling factor for each of the plurality of ECUs, wherein the respective reference leakage power for each of the plurality of ECUs is associated with a respective reference ECU for each of the plurality of ECUs, the respective reference leakage power being stored on the respective ECU.

25. The SoC of claim 24, further comprising:

means for identifying a respective reference settling voltage and a respective device settling voltage for each of the plurality of ECUs based on a respective operating frequency of each of the plurality of ECUs, the respective reference settling voltage being associated with the respective reference ECU and stored on the respective ECU of the plurality of ECUs, the respective device settling voltage being associated with the respective ECU and stored on the respective ECU;

means for identifying a respective reference leakage current associated with the respective reference ECU and a respective device leakage current associated with the respective ECU for each of the plurality of ECUs based on a respective junction temperature of each of the plurality of ECUs; and means for calculating the respective leakage scaling factor of each of the plurality of ECUs based on the respective reference settling voltage, the respective device settling voltage, the respective reference leakage current, and the respective device leakage current.

26. The SoC of claim 25, wherein the means for calculating the respective leakage scaling factor for each of the plurality of ECUs further comprises:

means for calculating a respective fraction of the respective device leakage current to the respective reference leakage current for each of the plurality of ECUs; and means for multiplying a respective junction temperature scaling factor to the respective fraction.

27. The SoC of claim 19, wherein the at least one thermal mitigation action comprises at least one of throttling an operating frequency or throttling a clock of the at least one ECU.

* * * * *